Figure 1:
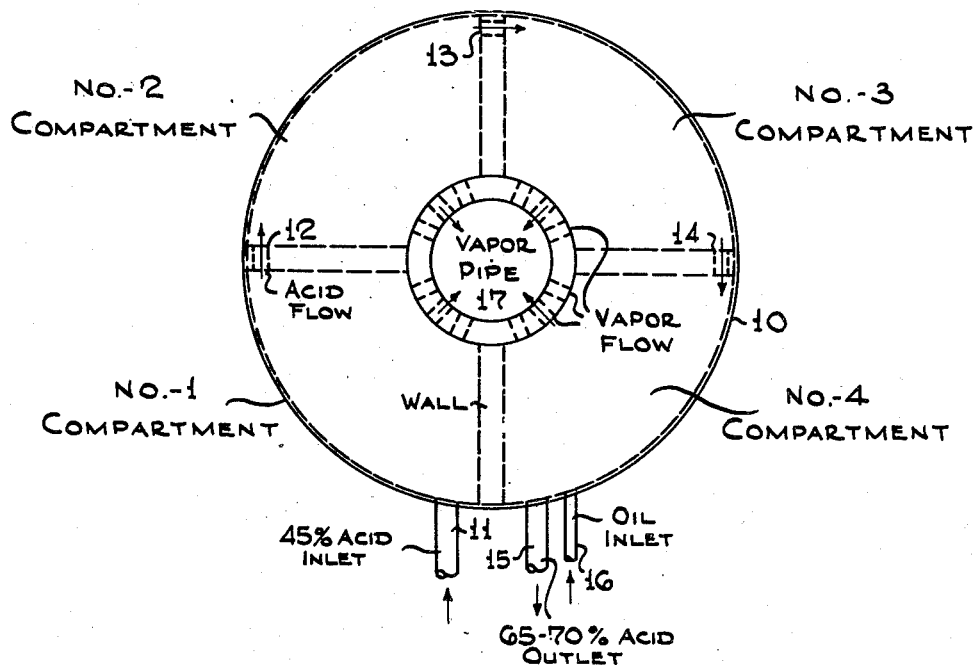

Nov. 21, 1950 — C. J. ROBRECHT ET AL — 2,530,954
REDUCING FOAM IN ACID CONCENTRATORS
Filed Oct. 1, 1947 — 2 Sheets-Sheet 1

Charles J. Robrecht
Charles W. Smith  Inventors
By W. O. Tilman  Attorney

Patented Nov. 21, 1950

2,530,954

UNITED STATES PATENT OFFICE 2,530,954

REDUCING FOAM IN ACID CONCENTRATORS

Charles J. Robrecht, Short Hills, and Charles W. Smith, Plainfield, N. J., assignors to Standard Oil Development Company, a corporation of Delaware Application October 1, 1947, Serial No. 777,276

1 Claim. (Cl. 23—173)

The present invention is concerned with an improved process for the reconcentration of spent acid from manufacturing processes wherein the acid becomes diluted. The invention is more particularly concerned with the reconcentration of dilute sulfuric acid utilized in the manufacture of alcohols and other compounds from unsaturated hydrocarbons. The invention is particularly directed and concerned with an improved process for the reconcentration of spent sulfuric acid wherein a Simonson-Mantius or an equivalent type acid concentrator is utilized. In accordance with our invention, foaming of the acid in the last compartment of an acid concentrator of this type is substantially eliminated by the addition of a high boiling oil to the outlet compartment.

It is well known in the art to manufacture alcohols and the like from unsaturated hydrocarbons by the use of strong sulfuric acid. In these processes it is essential that the acid be recovered efficiently otherwise the operation would be economically unfeasible. The manufacture of alcohols by this process is well known per se and no attempt will be made to describe the operation in detail. In general, product alcohol is obtained by hydrolysis and distillation wherein a weak or dilute acid remains as a residue. For example, in the process of making ethanol by absorption of ethylene in sulfuric acid, the sulfuric acid is diluted to about 45 weight percent during hydrolysis and stripping of the alcohol from the acid. In order to reconcentrate the 45% acid to a strength at which it can be handled in steel equipment, Simonson-Mantius or equivalent type concentrators are used, at approximately atmospheric pressure, to increase the acid strength to about 65 to 70% by weight. These concentrators, or reboilers, as they are commonly known, are conventionally divided into four quadrant-type compartments. The acid flows successively through the four compartments, in each of which there are located bayonet-type heaters which employ either steam or other suitable heating medium. The four compartments of the concentrator are balanced together in the vapor space. This is accomplished due to the steam which is evaporated from the acid in the respective compartments which leaves through a common central vapor pipe at the top of the concentrator. Since the vapor spaces are balanced together, the flow of acid beneath the compartment walls, from one compartment to another, is entirely by hydraulic head.

It has been found in the operation of an ethanol plant that foaming of acid occurs in the fourth or outlet compartment of the concentrator. This foaming substantially reduces the overall average density of the acidic material in the fourth compartment. Since the overflow line from the fourth compartment has a fixed elevation, a reduction of density of the liquid in this last compartment results in a corresponding lowering of the liquid level in the preceding three upstream compartments. Many disadvantages result from this condition. For example, the lowering of liquid levels in the upstream compartments exposes heating elements and thereby reduces the total heat transferred in the unit. In addition, when intermittent variation of the density of the liquid in the fourth compartment occurs, the accompanying variation of liquid level in the upstream compartments results in intermittent immersion and exposure of the heating elements. This thermal shock can produce a significant number of heating tube failures, resulting in loss of service factor on the equipment in order to effect repairs. Prior to shut-downs for repairs, the tube failures can result in loss of valuable Dowtherm (a mixture of about 26½% di-phenyl and 73½% di-phenyl oxide sold by the Dow Chemical Company), when this or similar heating mediums are used.

We have now discovered that providing a heavy oil is added to the outlet compartment of an acid concentrator of the Simonson-Mantius type, complete elimination of the foam is secured. The process of our invention may be more readily understood by reference to the drawing illustrating one embodiment of the same.

Figure 2:
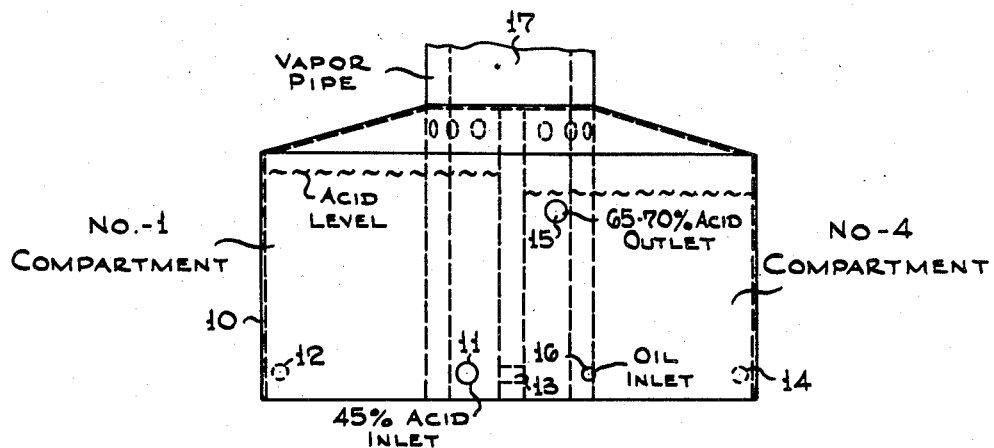

Figure 1 of the drawing is a plan view, while Figure 2 is an elevation view of the acid concentrators with which our invention is concerned. Referring specifically to Figure 1, dilute acid, which for the purpose of description is assumed to be a 45% sulfuric acid, is introduced into #1 compartment of acid concentrator 10 by means of feed line 11. The acid flows through #1 compartment through submerged conduit 12 into #2 compartment. The acid flows into #3 compartment through submerged conduit 13 and then into #4 compartment through submerged line or conduit 14. The oil is withdrawn from #4 compartment by means of overflow line 15 and under the conditions of operation is generally concentrated to about 65 to 70% concentration. In accordance with our invention, we introduce into #4 compartment a heavy oil by means of line 16.

Referring specifically to Figure 2, the weak acid as described in Figure 1 is introduced into compartment #1 by means of line 11 and withdrawn from the concentrator 10 by means of line 15. In accordance with our invention oil is introduced into #4 compartment by means of line 16. Water vapor is withdrawn from the concentrator through conduit 17.

Figure 3:
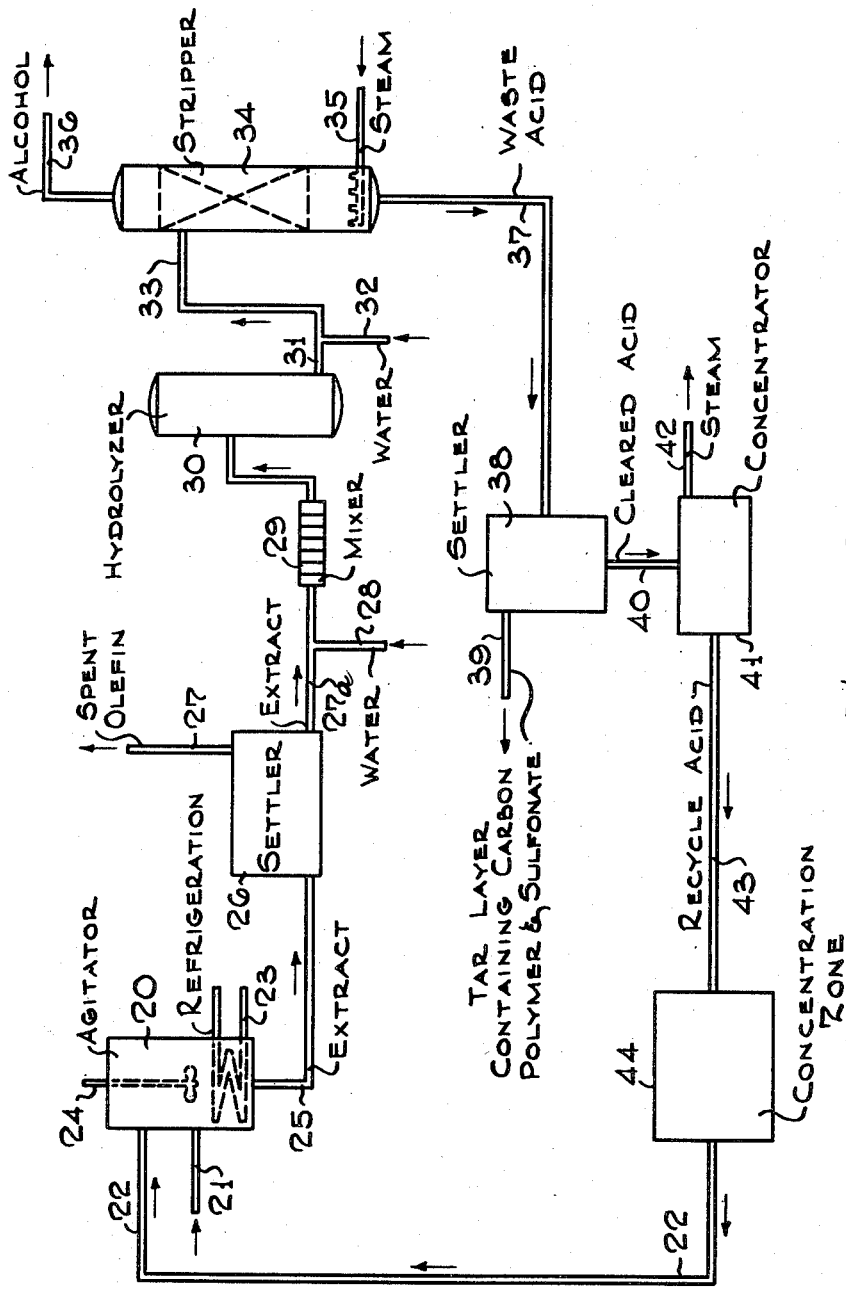

Figure 3 illustrates our invention adapted to the manufacture of ethanol from ethylene. Referring specifically to Figure 3, a hydrocarbon feed stock comprising ethylene is introduced into agitator 20 by means of line 21. Sulfuric acid of about 80 to 100% strength is introduced by means of line 22 into agitator 20 at a point above the introduction of the olefins. A temperature in the range of about 25 to 100° C. is maintained in agitator 20 by means of refrigeration coil 23. In the agitator, the acid and the olefins are thoroughly contacted by means of stirrer 24 whereupon the olefins are absorbed in the sulfuric acid, forming an acid extract which is removed from the bottom of agitator 20 by means of line 25. The acid extract removed from the bottom of absorber 20 by means of line 25 is introduced into settler 26 from which unabsorbed olefins are removed through line 27a. The extract free of unabsorbed hydrocarbons is removed from settler 26 through line 27 and diluted with water which is introduced by means of line 28 to produce an acid strength of about 65 to 75%, on a hydrocarbon basis. The extract and water are then passed through mixer 29 to hydrolyzer 30. Diluted acid extract containing alkyl sulfates and alcohol is passed from the bottom of the hydrolyzer through line 31 and additional water is introduced by means of line 32 to reduce the acid concentration to about 45% on a hydrocarbon free basis. The dilute extract is passed by means of line 33 into the top of stripping tower 34 where ethyl alcohol is stripped from the extract by the countercurrent action of steam introduced by means of line 35. The alcohol is removed overhead from zone 34 by means of line 36.

The dilute acid is withdrawn from stripper 34 by means of line 37 and introduced into a settling zone 38. A tarry layer is withdrawn from zone 38 by means of line 39. A bottom acid layer is withdrawn from zone 38 by means of line 40 and introduced into a concentrator 41 which, in accordance with the present invention, comprises a four-compartment type concentrator. Steam is withdrawn from concentrator 41 by means of line 42. In accordance with our invention, oil is introduced into the outlet compartment of the four-compartment concentrator 41. The reconcentrated acid is withdrawn by means of line 43. This acid is generally concentrated to a concentration in the range from about 60 to 70%. The acid is then preferably passed to a vacuum concentration zone 44 wherein the concentration of the acid is increased to an acid strength in the range from about 70 to 95% concentration. This acid of this concentration is withdrawn from zone 44 by means of line 22 and recycled, after fortification with oleum, to the ethanol absorption zone.

Our invention is generally concerned with the prevention of foam in a multi-compartment type concentrator. It is particularly concerned with the prevention of foam in a Simonson-Mantius type concentrator sold by the National Lead Company of New York, or equivalent type concentrator. In concentrators of this character, the temperatures of the acid in the various compartments will show a progressive rise from the inlet to the outlet compartment corresponding to the boiling point of the particular acid concentrations. For example, when concentrating sulfuric acid from about 45% concentration to about 65 to 75% concentration, typical temperatures in the respective compartments are as follows:

|  | °F. |
|---|---|
| Inlet compartment | 284 |
| #2 compartment | 293 |
| #3 compartment | 309 |
| Outlet compartment | 334 |

In accordance with our invention we prevent foaming in #4 compartment by adding to this compartment a heavy oil. In accordance with the preferred adaptation of our invention, the heavy oil contains a small amount of a fatty acid. The process of our invention may be further understood by the following examples illustrating embodiments of the same.

Example 1

An oil having the following specification:

| Gravity, degrees A. P. I. | 28.2 |
|---|---|
| Distillation: | |
| IBP | °F__647 |
| 10% off at | °F__714 |
| 50% | °F__771 |
| 90% | °F__835 |
| FBP | °F__856 | and containing 100 cc. oleic acid per gallon oil was added to the fourth compartment of a Simonson-Mantius concentrator. The amount of oil-oleic acid employed was 4 gallons each 8 hours during which time about 224,000 pounds of acid (100% basis) was handled. Prior to the addition of the oil severe fluctuations in compartment levels and acid feed rates occurred spasmodically and bayonet heating tube breakage with Dowtherm loss was severe. Actually the capacity of the entire integrated plant was limited in capacity by the poor performance of the reboilers. The results were most striking promptly after the first addition. In spite of the fact that the reboiler acid feed rate was maintained constant, upon addition to the fourth compartment, product acid flow ceased entirely for a period of 45 minutes, during which the depleted compartment levels were restored by replacement of foam by liquid in the fourth compartment and the build-up of levels in the upstream compartments to provide sufficient head to cause normal flow through the equipment. Subsequently, it became necessary to reduce the rate of heat input of the Dowtherm to prevent overconcentration and excessive loss of acid through decomposition and evolution of $SO_3$. After the initial period of settling down, it was found that the rate of oil-oleic acid addition could be reduced to a figure of ½ gallon each 8 hours without reappearance of foaming.

Example 2

A similar base oil was used as described in Example 1 in another run, except that the oleic acid was omitted. A rate of ½ gallon oil each 8 hours was sufficient to prevent foaming. The acid rate at this time was also 224,000 pounds each 8 hours expressed as 100% $H_2SO_4$.

Our invention may be adapted for the prevention of foaming in any multi-compartment acid concentrator. It is particularly directed to the prevention of foam when the feed acid is a sulfuric acid having a concentration in the range from about 45 to 60% and the concentrated acid is in the range from about 60 to 70%.

Our invention is generally concerned with the prevention of foam in the outlet compartment by utilizing a heavy oil. The heavy oil employed is preferably a petroleum oil having an A. P. I. gravity in the range from about 26 to 35 degrees. Furthermore, it is preferred that the oil boil in the range between about 600° F. and 900° F. in order to avoid excessive loss of the same.

The amount of oil added per gallon of acid concentrated may vary considerably. In general it is preferred that about 0.03 to 0.15 gallon of oil be added per thousand gallons of concentrated acid withdrawn from the outlet compartment. When a fatty acid is employed it is preferred that about 25 to 200 cc. of the fatty acid be utilized per gallon of oil employed. The fatty acid may comprise an oleic, a stearic, a palmitic, an arachidic, an erucic, a rapinic, or a mixture of these.

The process of our invention is not to be limited by any theory as to mode of operation, but only in and by the follwing claim in which it is desired to claim all novelty insofar as the prior art permits.

We claim:

Improved process for concentrating sulfuric acid secured in the manufacture of alcohols from olefins which comprises introducing the acid into a concentrator comprising four stages, passing the acid successively through the four stages and gradually increasing the temperature in the respective stages, adding from about .03 to 15 gallons of oil per thousand gallons of acid to the final stage, said oil being characterized by being a petroleum oil having gravity in the range from about 26 to 35° A. P. I. and having dissolved therein from about 25 to 200 ccs. of a fatty acid, whereby foaming of the acid is prevented, and withdrawing concentrated acid from the fourth stage.

CHARLES J. ROBRECHT.
CHARLES W. SMITH.

REFERENCES CITED

The following references are of record in the file of this patent:

UNITED STATES PATENTS

| Number | Name | Date |
|---|---|---|
| 1,991,745 | Hechenbleikner | Feb. 19, 1935 |
| 2,414,737 | Heinrich | Jan. 21, 1947 |
| 2,414,759 | Mottern | Jan. 21, 1947 |
| 2,426,082 | Cone | Aug. 19, 1947 |
| 2,433,030 | Cone | Dec. 23, 1947 |
| 2,441,521 | Van der Valk et al. | May 11, 1948 |